(12) United States Patent
Reeves

(10) Patent No.: US 6,685,421 B1
(45) Date of Patent: Feb. 3, 2004

(54) HITCH-MOUNTED LIFT ASSEMBLY

(76) Inventor: Charles N. Reeves, 325 Middleton Rd., Grovetown, GA (US) 30813

( * ) Notice: Subject to any disclaimer, the term of this patent is extended or adjusted under 35 U.S.C. 154(b) by 0 days.

(21) Appl. No.: 10/334,307

(22) Filed: Jan. 2, 2003

(65) Prior Publication Data (65)

(51) Int. Cl.$^7$ .................................................. B60P 9/00
(52) U.S. Cl. ........................ 414/462; 414/540; 224/519
(58) Field of Search ................................. 414/462, 540, 414/546; 224/502, 519, 524

(56) References Cited

U.S. PATENT DOCUMENTS

| | | | | |
|---|---|---|---|---|
| 3,348,713 A | * | 10/1967 | Will | 414/462 |
| 3,528,578 A | * | 9/1970 | Schoenberger | 414/462 |
| 3,695,469 A | * | 10/1972 | Arant | 414/462 |
| 3,931,903 A | * | 1/1976 | Johnson | 414/462 |
| 4,234,284 A | * | 11/1980 | Hauff | 414/462 |
| 4,569,626 A | | 2/1986 | Svanberg | |
| 4,813,842 A | | 3/1989 | Morton | |
| 5,431,522 A | * | 7/1995 | Ross | 414/462 |
| 5,456,564 A | * | 10/1995 | Bianchini | 414/462 |
| 5,567,107 A | * | 10/1996 | Bruno et al. | 414/462 |
| 5,588,793 A | | 12/1996 | Chang | |
| 5,685,686 A | * | 11/1997 | Burns | 414/462 |
| 6,082,958 A | | 7/2000 | Jensen | |
| 6,139,247 A | * | 10/2000 | Wright | 414/462 |
| 6,164,895 A | | 12/2000 | Croswell | |
| D440,728 S | | 4/2001 | Schlangen | |
| 6,345,749 B1 | * | 2/2002 | Hamilton | 224/509 |
| 6,364,597 B2 | * | 4/2002 | Klinkenberg | 414/462 |
| 6,626,340 B1 | * | 9/2003 | Burgess | 224/536 |

* cited by examiner

Primary Examiner—Douglas Hess

(57) ABSTRACT

A hitch mounted lift assembly for loading, transporting, and unloading wheelchairs and the like from a pickup truck, in particular. The hitch mounted lift assembly includes a hitch receiver which is adapted to be securely mounted to a vehicle; and also includes a hitch assembly including a hitch member being removably and engageably received in the hitch receiver; and further includes a pivot support assembly including an elongate pivot support member being pivotally attached to the hitch member; and also includes a plurality of sleeves being spacedly attached to the elongate pivot support member; and further a platform support assembly including an elongate platform support member being pivotally received through the sleeves; and also includes a platform being securely attached to the platform support assembly.

7 Claims, 2 Drawing Sheets

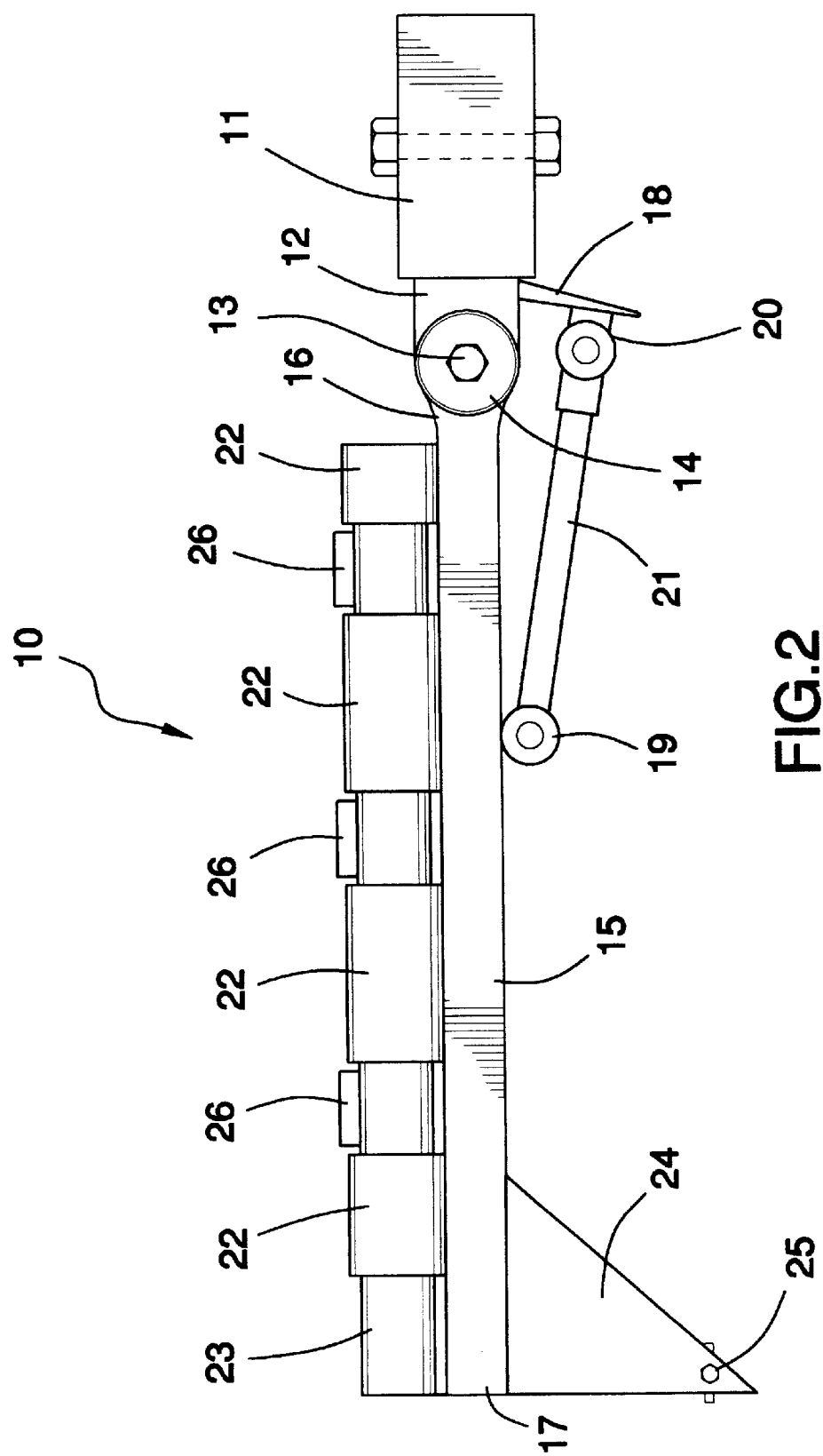

HITCH-MOUNTED LIFT ASSEMBLY

BACKGROUND OF THE INVENTION

1. Field of the Invention

The present invention relates to hitch mounted lifts and more particularly pertains to a new hitch mounted lift assembly for loading, transporting, and unloading wheelchairs and the like from a pickup truck, in particular.

2. Description of the Prior Art

The use of hitch mounted lifts is known in the prior art. More specifically, hitch mounted lifts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,164,895; U.S. Pat. No. 4,813,842; U.S. Pat. No. 4,569,626; U.S. Pat. No. 6,082,958; U.S. Pat. No. 5,588,793; and U.S. Pat. No. Des. 440,728.

While these devices fulfill their respective, particular objectives and requirements, the aforementioned patents do not disclose a new hitch mounted lift assembly. The prior art includes lifts being mounted to hitch receivers and being raised and lowered relative to the ground surface.

SUMMARY OF THE INVENTION

The general purpose of the present invention, which will be described subsequently in greater detail, is to provide a new hitch mounted lift assembly which has many of the advantages of the hitch mounted lifts mentioned heretofore and many novel features that result in a new hitch mounted lift assembly which is not anticipated, rendered obvious, suggested, or even implied by any of the prior art hitch mounted lifts, either alone or in any combination thereof. The present invention includes a hitch receiver which is adapted to be securely mounted to a vehicle; and also includes a hitch assembly including a hitch member being removably and engageably received in the hitch receiver; and further includes a pivot support assembly including an elongate pivot support member being pivotally attached to the hitch member; and also includes a plurality of sleeves being spacedly attached to the elongate pivot support member; and further a platform support assembly including an elongate platform support member being pivotally received through the sleeves; and also includes a platform being securely attached to the platform support assembly. None of the prior art includes the combination of the elements of the present invention.

There has thus been outlined, rather broadly, the more important features of the hitch mounted lift assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new hitch mounted lift assembly which has many of the advantages of the hitch mounted lifts mentioned heretofore and many novel features that result in a new hitch mounted lift assembly which is not anticipated, rendered obvious, suggested, or even implied by any of the prior art hitch mounted lifts, either alone or in any combination thereof.

Still another object of the present invention is to provide a new hitch mounted lift assembly for loading, transporting, and unloading wheelchairs and the like from a pickup truck, in particular.

Still yet another object of the present invention is to provide a new hitch mounted lift assembly that is easy and convenient to set up and use.

Even still another object of the present invention is to provide a new hitch mounted lift assembly that functions as an extension to the bed of the pickup truck to allow the carrying of additional objects not capable of being carried upon the bed of the pickup truck and also can be easily attached to a passenger vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a front elevational view of the present invention.

DESCRIPTION OF THE PREFERRED EMBODIMENT

Figure 1:
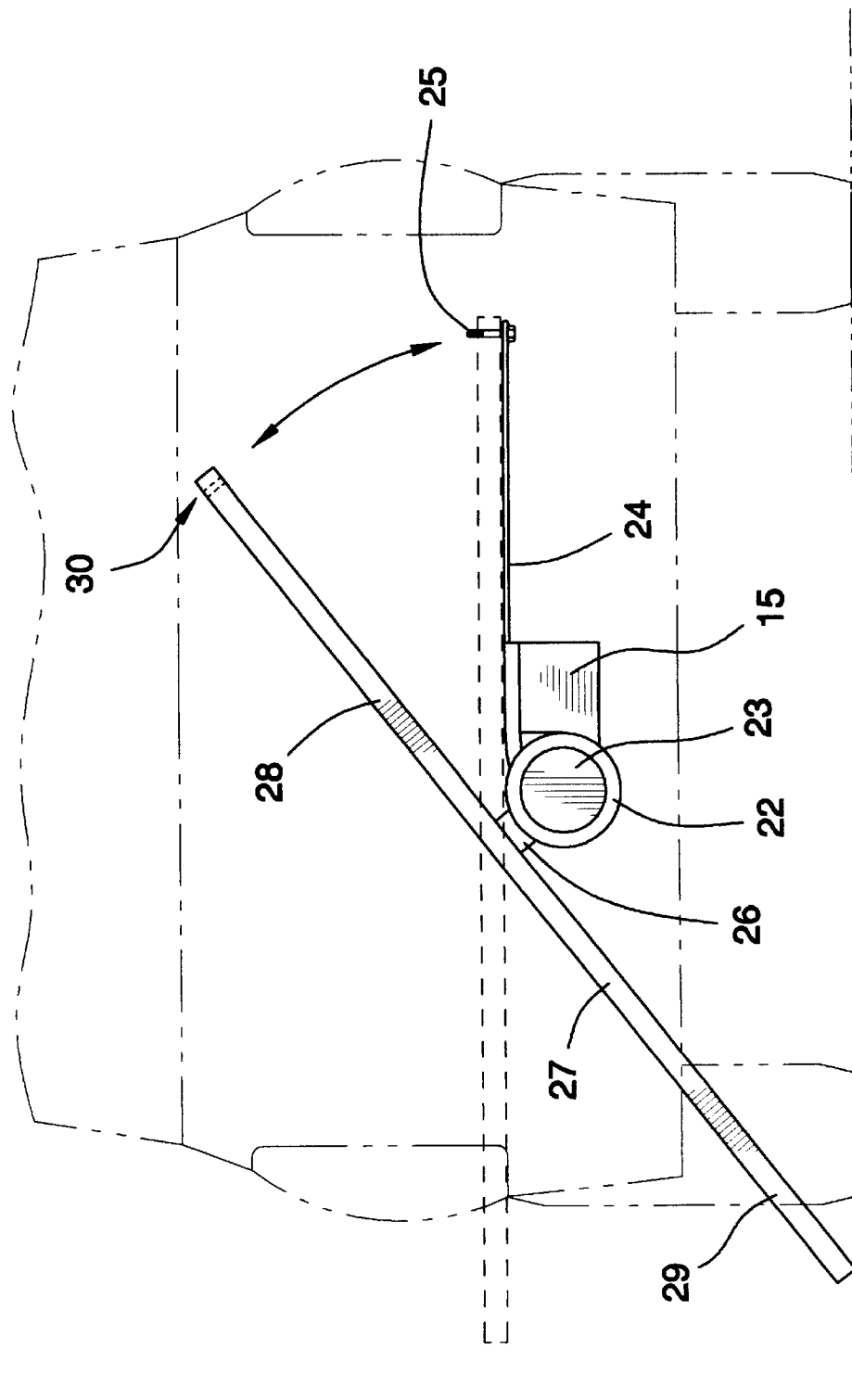
FIG. 1 is a side elevational view of a new hitch mounted lift assembly according to the present invention.

With reference now to the drawings, and in particular to FIGS. 1 through 2 thereof, a new hitch mounted lift assembly embodying the principles and concepts of the present invention and generally designated by the reference numeral 10 will be described.

As best illustrated in FIGS. 1 through 2, the hitch mounted lift assembly 10 generally comprises a hitch receiver 11 which is adapted to be securely mounted to a vehicle. A hitch assembly includes a hitch member 12 being removably and engageably received in the hitch receiver 11. The hitch assembly also includes an elongate fastener 13 being conventionally disposed through side walls of the hitch member 12, and further includes an elongate fastener support plate 14 through which the elongate fastener 13 is conventionally disposed.

A pivot support assembly includes an elongate pivot support member 15 being pivotally and conventionally attached with said elongate fastener 13 to the hitch member 12. The pivot support assembly also includes a first bracket 18 being securely and conventionally attached to and depending from the hitch member 12; and further includes a second bracket 19 being conventionally attached to the elongate pivot support member 15; and also includes a motor 20 being conventionally mounted to the first bracket 18; and further includes an elongate screw member 21 having a first end being rotatably connected to and adjustably moved by the motor 20 and having a second end which is pivotally and conventionally attached to the second bracket 19 for raising and lowering the elongate pivot support member 15 relative to the ground surface. The elongate fastener 13 is conventionally disposed through a first end 16 of the elongate pivot support member 15 to allow the elongate pivot support member 15 to pivot relative to the hitch member 12.

A plurality of sleeves 22 are spacedly attached and welded to the elongate pivot support member 15. The sleeves 22 are spaced along a length of the elongate pivot support member 15.

A platform support assembly includes an elongate platform support member 23 being pivotally received through the sleeves 22. The platform support assembly further includes a platform hold-down assembly including a rigid strip of material 24 having a first end being securely and conventionally attached and welded to the elongate pivot support member 15 near a second end 17 thereof and extending outwardly therefrom and generally horizontally relative to a ground surface, and also includes a fastening member 25 being conventionally attached near a second end of the rigid strip of material 24. The platform support assembly also includes a plurality of connectors 26 being spacedly and conventionally attached and welded to the elongate platform support member 23 and being disposed between the sleeves 22.

A platform 27 is securely and conventionally attached and welded to the platform support assembly. The platform has a bottom side and also has a hole 30 being disposed therethrough near an end thereof and further has a first portion 28 and a second portion 29. The connectors 26 are conventionally attached and welded to the bottom side of the platform 27 along a line adjoining the first and second portions 28,29 to allow the platform 27 to teeter upon the elongate platform support member 23. The rigid piece of material 24 supports the first portion 28 of the platform 27 in a horizontal position relative to the ground surface. The fastening member 25 is removably received in the hole 30 of the platform 27 to hold down the platform 27 is a transport position.

In use, the user lowers the elongate pivot support member 15 in a generally horizontal position or parallel to the ground surface by using the motor which is connected with wires to the battery of the vehicle. The user then releases the platform 27 from the fastening member 25 and pivots the platform 27 so that the second portion 29 of the platform 27 is lowered to the ground surface. The user moves the object such as a wheelchair or an ATV upon the platform 27 and lifts the second portion 29 of the platform 27 and fastens the platform 27 to the rigid piece of material 24 using the fastening member 25 with the platform being generally parallel to the ground surface or in a transport position. Once finished, the user can again lower the second portion 29 of the platform 27 to unload the wheelchair or ATV from the platform 27.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the hitch mounted lift assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch mounted lift assembly comprising:

a hitch receiver which is adapted to be securely mounted to a vehicle;

a hitch assembly including a hitch member being removably and engageably received in said hitch receiver;

a pivot support assembly including an elongate pivot support ember being pivotally attached to said hitch member;

a plurality of sleeves being spacedly attached to said elongate pivot support member;

a platform support assembly including an elongate platform support member being pivotally received through said sleeves; and a platform being securely attached to said platform support assembly.

2. The hitch mounted lift assembly as described in claim 1, wherein said hitch assembly also includes an elongate fastener being disposed through side walls of said hitch member, and further includes an elongate fastener support plate through which said elongate fastener is disposed.

3. The hitch mounted lift assembly as described in claim 2, wherein said pivot support assembly also includes a first bracket being securely attached to and depending from said hitch member; and further includes a second bracket being attached to said elongate pivot support member; and also includes a motor being mounted to said first bracket; and further includes an elongate screw member having a first end being rotatably connected to said motor and having a second end which is pivotally attached to said second bracket for raising and lowering said elongate pivot support member relative to the ground surface, said elongate fastener being disposed through a first end of said elongate pivot support member for allowing said elongate pivot support member to pivot relative to said hitch member.

4. The hitch mounted lift assembly as described in claim 3, wherein said sleeves are spaced along a length of said elongate pivot support member.

5. The hitch mounted lift assembly as described in claim 4, wherein said platform support assembly further includes a platform hold-down assembly including a rigid strip of material having a first end being securely attached to said elongate pivot support member near a second end thereof and extending outwardly therefrom and generally horizontally relative to a ground surface, and also includes a fastening member being attached near a second end of said rigid strip of material.

6. The hitch mounted lift assembly as described in claim 5, wherein said platform support assembly also includes a plurality of connectors being spacedly attached to said elongate platform support member and being disposed between said sleeves.

7. The hitch mounted lift assembly as described in claim 6, wherein said platform has a bottom side and also has a hole being disposed therethrough near an end thereof and further has a first portion and a second portion, said connectors being attached to said bottom side of said platform along a line adjoining said first and second portions to allow said platform to teeter upon said elongate platform support member, said rigid piece of material supporting said first portion of said platform in a horizontal position relative to the ground surface, said fastening member being removably received in said hole of said platform to hold down said platform.

* * * * *